United States Patent [19]

Allen

[11] Patent Number: 5,099,121
[45] Date of Patent: Mar. 24, 1992

[54] TEMPERATURE MEASURING METHOD USING INFRARED SENSORS AND PROCESSOR

[75] Inventor: John B. Allen, Richardson, Tex.

[73] Assignee: Texas Instruments Incorporated, Dallas, Tex.

[21] Appl. No.: 521,967

[22] Filed: May 11, 1990

[51] Int. Cl.$^5$ .......................... G01J 5/00; G01N 25/00
[52] U.S. Cl. ................................ 250/339; 250/338.1; 374/9; 374/121
[58] Field of Search ........................... 250/339, 338.1; 374/128, 121, 9

[56] References Cited

U.S. PATENT DOCUMENTS

| | | | |
|---|---|---|---|
| 4,561,786 | 12/1985 | Anderson | 374/129 |
| 4,693,615 | 9/1987 | Kyriakis | 374/129 |
| 4,845,647 | 7/1989 | Dils et al. | 364/557 |
| 4,924,478 | 5/1990 | Tank | 374/121 |

FOREIGN PATENT DOCUMENTS 3115887 11/1982 Fed. Rep. of Germany ...... 250/339

OTHER PUBLICATIONS

M. Umeno, H. Hattori, T. Jimbo and M. Sakamoto, "A Dual Spectral Band Infrared Thermo-Ratioscope", Proceedings of the ICO-11 Confererence, Madrid, Spain [ESX] (Sep. 10-17, 1978) pp. 803-806.

*Primary Examiner*—Constantine Hannaher
*Attorney, Agent, or Firm*—René E. Grossman; Richard L. Donaldson

[57] ABSTRACT

A method of measuring the temperature of a remote body which comprises determining the frequency range to be covered and the portion of that range or frequency band to be covered by each detector of a detector array or by a single detector via a filter for applying different frequency bands to the single detector. The required detector or detectors are then provided and sense the energy radiated by the remote body whose temperature is to be measured. The detector or detectors then provide an output of the amount of energy measured in each unique frequency band and sends these measured outputs to a processor. The processor receives the measured outputs from the detector(s) and determines therefrom in accordance with an algorithm thereat the measured temperature. The processor then provides an output indicative of the measured temperature.

8 Claims, 4 Drawing Sheets

A SENSOR DESIGN SCHEMATIC

SCHEMATIC OF A MULTI-SPECTRAL SENSOR TO MEASURE TEMPERATURE AND EMISSIVITY WHICH UTILIZES A FILTER WHEEL.

PRIOR ART

SCHEMATIC OF A MULTI SPECTRAL SENSOR TO MEASURE TEMPERATURE AND EMISSIVITY WHICH UTILIZES A SCANNER.

A SENSOR DESIGN SCHEMATIC

TEMPERATURE AND EMISSIVITY ESTIMATION ALGORITHM

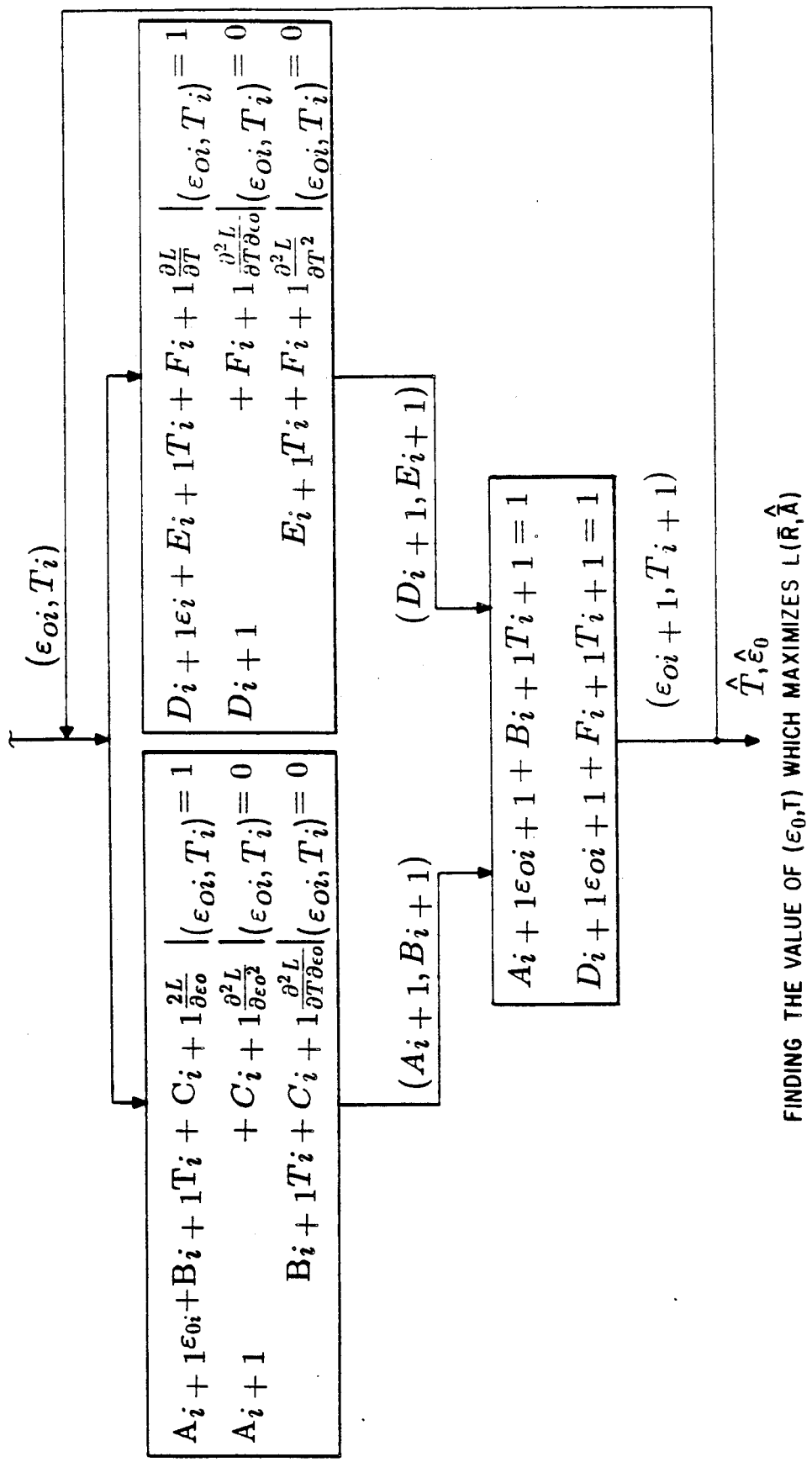
FIG. 3C  FINDING THE VALUE OF $(\varepsilon_0, T)$ WHICH MAXIMIZES $L(\bar{R}, \hat{A})$

TEMPERATURE MEASURING METHOD USING INFRARED SENSORS AND PROCESSOR

BACKGROUND OF THE INVENTION

1. Field of the Invention

This invention relates to apparatus for accurately and remotely determining the temperature and emissivity of a body.

2. Brief Description of the Prior Art

The temperature and emissivity of a body is determined by measurement of the radiation, called the spectral radiance, which is emitted by the body. The spectral radiance $W(\lambda)$ of a body of temperature T and emissivity ($\epsilon$) is given by Planck's Law as:

$$W(\lambda) = \frac{\epsilon C_1}{\lambda^5 [e^{C_2/kT} - 1]} \quad (1)$$

where $W(\lambda)$ = spectral radiant emittance, $W\ cm^{-2}\mu^{-1}$
$\lambda$ = wavelength, $\mu$
T = absolute temperature, degrees K.
$C_1 = (3.3.7415 +/- 0.003) \times 10^4\ W\ cm$.
$C_2 = (1.43879 +/- 0.00019) \times 10^4$ degrees K.

The emissivity factor can also be a function of wavelength, i.e., $\epsilon = \epsilon(\lambda)$. If contact can be made with a radiating body, the temperature can be readily measured with a thermocouple. If the composition of the surface of the body is known, emissivity can be estimated. However, if the body is remotely located with respect to the instrumentation, temperature and emissivity estimates must be derived from the only quantity available to the experimenter, namely, the radiation emitted by the body. As an example, it may be desirable to make temperature and emissivity measurements of a rocket plume. The environment of the plume may preclude placing instrumentation in the plume or the rocket could be in flight whereby the plume would be inaccessible. A remote temperature and emissivity measuring device in this instance would be useful.

The passive radiation, $W(\lambda)$, available to the instrument will range from a lower wavelength cutoff $\lambda_L$ to an upper wavelength cutoff $\lambda_u$. Wavelengths lower than $\lambda_L$ and higher than $\lambda_u$ are not available for several reasons. The amount of radiation of the body outside these limits may be very small or non-existent. Detectors sensitive to the radiation may not exist or be prohibitively expensive. The atmosphere between the instruments and the body may absorb or scatter the radiation before it reaches the instrument.

An instrument to measure temperature and emissivity of an object from its spectral radiance is depicted in FIG. 1. An afocal lens recollimates the incoming radiation and directs it to an imaging lens. The imaging lens creates an image of the object in the focal plane. A detector sensitive to wavelengths from $\lambda_L$ to $\lambda_u$ is placed in the focal plane. A wheel with N filters is positioned so that one filter at a time is placed in the optical path. Each filter i transmits radiation for $\lambda_{iL}$ to $\lambda_{iu}$ to the detector. The sub-band ($\lambda_{iL}$, $\lambda_{iu}$) is contained in the pass band ($\lambda_L$, $\lambda_u$). The wheel is moved into several positions, allowing the detector to make measurements in each of the N sub-bands. The output of the detector is amplified, digitized and sent to a processor to determine temperature and emissivity. An alternate configuration is shown in FIG. 2 wherein a separate detector is available for each sub-band. Each detector has a filter in front of it allowing only radiation in the desired sub-band to reach the detector. A scanner moves the image by the detectors which successively gathers radiation from the image. The processor then takes the output of the detectors and determines the temperature and emissivity estimate of the object.

Remote temperature estimating devices of the type shown in FIGS. 1 and 2 fall into several categories. In the first category, the spectral radiance is measured in one preselected wavelength band and the magnitude of the radiation is related to the object temperature by a table look up processor. More specifically, radiation from the object whose temperature is to be measured enters the lens and is imaged into the detector. A filter placed in front of the detector restricts the radiation falling on the detector to the preselected band from $\lambda_1$ to $\lambda_2$. Output $R_T$ is given by:

$$R_T = \int_{\lambda_1}^{\lambda_2} \frac{A_L \eta C_1 \epsilon_0 d\lambda}{\lambda^5 (e^{C_2/KT_0} - 1)} \quad (2)$$

where $A_L$ = area for the lens
$\eta$ = detector quantum efficiency (electrons/photon)
$T_o$ = object temperature $\epsilon_o$ = emissivity of the object.

The processor contains candidate values of $R_T$ computed beforehand for a wide range of temperatures. The emissivity is generally assumed to be unity and atmospheric transmission is also assumed to be unity. If these assumptions are correct, the instrument will yield a reasonable answer. However, under many conditions, these assumptions are not valid and the temperature estimate will be inaccurate.

In the second category, the "color ratio" approach is used. The measurement of the radiation in band 1 and band 2, denoted by R1 and R2, respectively, are used to form the ratio, $$Z = \frac{R1}{R2} \quad (3)$$

This ratio can then be used to form a temperature estimate T as follows:

$$\hat{T} = f(z). \quad (4)$$

The relationship of f(z) can be derived from Planck's law. If the measurements R1 and R2 are low in noise, T can be an accurate estimate of temperature. However, noise is a reality in many applications and noise is significant. There is no obvious way to incorporate the data from other spectral bands into the ratio. Hence, the color ratio method does not make use of available data.

The measurements from several wavelength bands may be available for temperature estimation. The sensor can be a single detector device with a plurality of spectral filters successively laced in front of the detector (FIG. 1) or a multiple detector device with each detector preceded by a single spectral filter (FIG. 2). The instrument can also be a Fourier spectrometer. The resulting measurements are then curve fit to the black body spectral distribution as given by Planck's law (Equations (1) and (2). The temperature which provides the best fitting curve to the data is taken as the temperature of the object. This procedure neglects to make use of the fact that some spectral bands are more useful than others in estimating temperature. In addition, there is no obvious way to incorporate a priori data which may be available.

SUMMARY OF THE INVENTION

The present invention sets forth a method to select the number and wavelength region of each sub-band. A processor is then disclosed which takes the detector outputs and determines temperature and emissivity. The processor utilizes a priori data about the object as well as measured data. It may be known beforehand that the temperature and emissivity of the object is confined to certain limits. Such additional information is used to improve the accuracy of the temperature and emissivity measurement.

The present invention also provides a rationale for selecting the proper spectral bands for the device in FIGS. 1 and 2 and a method for estimating both the temperature of the remote object and of the emissivity thereof. The invention provides both temperature and emissivity estimates which approach the fundamental limits of accuracy dictated by statistical theory.

If a parametric measurement includes any noise, the estimate of parameters from that measurement cannot be arbitrarily accurate. A limit upon that accuracy is given by the famous Cramer-Rao bound as set forth in *Detection, Estimation and Modulation Theory, Part I*, of Harry L. Van Trees, John Wiley & Sons, 1968 at pages 66ff. The bound is a function of the signal from which the measurements are made, the noise present in the measurements, and the characteristics of the instrument making the measurements. This invention formulates the bound for temperature and emissivity estimates in terms of the instrument parameters and then chooses those parameters so as to minimize the bound, i.e., minimize the fundamental limits of the errors in the temperature and emissivity estimates made by the instrument. To be more specific, the expression for the ith spectral band measurements $R_i$ of the device in FIG. 1 and 2 is given by $$R_i = \frac{G}{4F_\#^2} \int_{\lambda_i}^{\lambda_{i+1}} \frac{A_D \tau_A(\lambda)\tau_0(\lambda)\eta(\lambda)\epsilon_0 C_1 \lambda d\lambda}{\lambda^5 [e^{c_2/\lambda T} - 1]hc} \quad (5)$$

$$= \epsilon_0 K S_i + \eta_i$$

where $$K = \frac{GA_D}{4F_\#^2}$$

$$S_i = \int_{\lambda_i}^{\lambda_{i+1}} \frac{\tau_A(\lambda)\tau_0(\lambda) C_1 \lambda d\lambda}{\lambda^5 (e^{c_2/\lambda T} - 1)hc}$$

G = amplifier gain
F# = effective F-number of the sensor
$A_D$ = area of the detector
$(\lambda_{Li}, \lambda_{ui})$ = spectral limits of the ith sub-band
$\tau_A(\lambda)$ = atmospheric transmission
$\eta(\lambda)$ = detector quantum efficiency
$\eta_i$ = noise present in the estimate If one is dealing with a N-band sensor, there are N terms of the form of $R_i$. The performance bound is given by an N-dimensional Cramer-Rao bound obtained in the following manner. The unknown quantities $\epsilon_0$ and T are components of a vector $\overline{A}$, i.e., $$\overline{A} = (\epsilon_0, T)$$

and the spectral bands $R_i$ form an N-component vector $\overline{R}$ defined as $$\overline{R} = (R_1, R_2, \ldots R_N)$$

The conditional probability of $\overline{R}$ With respect to $\overline{A}$, symbolized by $P_{\overline{R}/\overline{A}}(\overline{R}/\overline{A})$ is formed. A matrix, called Fisher's Matrix, defined as $$J_{ij} \triangleq E\left[ \frac{\partial \ln P_{R/A}(R/A)]}{\partial A_i} \cdot \frac{\partial \ln[P_{R/A}(R/A)]}{\partial A_j} \right] \quad (6)$$

where
J = Fishers Matrix
$J_{ij}$ = (i,j) term of Fishers Matrix
E(.) = expected value operation
ln(.) = natural logarithm operation Let $J^{-1}$ be the inverse of matrix J and let $J^{-1}{}_{ij}$ be the (i,j) term of the inverse matrix. The bound on the mean squared error in estimating $A_i$ is given by $J_{ii}$. In other words, $$\sigma_{Ai} \geq J^{-1}{}_{ii} \quad (7)$$

where $\sigma^2{}_{Ai}$ is the variance of any estimator of $A_i$.

Upon application of the above procedure to the spectral analysis problem, one obtains $J^{-1}{}_{11}$ and $J^{-1}{}_{22}$ which are the bounds on the emissivity and temperature estimates and are given by $$J^{-1}{}_{11} = J_{11}(G, \tau_A, \tau_0, \eta, \epsilon_0, T, F\#^2, N)$$

$$J^{-1}{}_{22} = J_{11}(G, \tau_A, \tau_0, \eta, \epsilon_0, T, F\#, N) \quad (8)$$

The bounds $J^{-1}{}_{11}$ and $J^{-1}{}_{22}$ are a function of the sensor design parameters $(G, \eta, \tau_0, F\#^2)$, the environment $\tau_A(\lambda)$ and the unknowns $(\epsilon_0, T)$. The sensor parameters are selected to minimize $J^{-1}{}_{11}$ and $J^{-1}{}_{22}$ for a given environment and a given range of temperatures and emissivities.

Once the sensor has been specified and its performance bounds determined, the next step is to specify the processor. The estimation algorithm for temperature and emissivity is of the maximum likelihood variety. A likelihood function $L(\overline{R}, \hat{\overline{A}})$ is formed where $$L(\overline{R}, \hat{\overline{A}}) = -\sum_{i=1}^{N} \frac{(R_i - K\epsilon_0 S_i)^2}{\sigma_i^2} \quad (9)$$

where
$\sigma^2{}_i$ = variance of the noise term $n_i$
$R_i$ = sensor measurements in the ith sub-band
$\hat{\overline{A}}$ = estimate of $\overline{A}$.

The estimate $\hat{\overline{A}}$ is varied until the value of $\overline{A}$ is found which maximizes $L(\overline{R}, \hat{\overline{A}})$. The value of $\hat{\overline{A}}$ which maximizes $L(\overline{R}, \hat{\overline{A}})$ is taken to be the maximum likelihood estimate of $\overline{A}$. It will be recognized by those skilled in numerical analysis that techniques exist to rapidly find through the use of a digital processor the value of A which maximizes $L(\overline{R}, \hat{\overline{A}})$.

It is possible that a priori information regarding $\overline{A}$ is available. $\overline{A}$ may not be completely arbitrary and may be a random variable with probability density $P_{\overline{A}}(\overline{A})$. In this case, Fisher's matrix becomes $$J_{ij} = \left[ \frac{\partial \ln[P_{\overline{R}/\overline{A}}(\overline{R}/\overline{A})]}{\partial A_i} \cdot \frac{\partial \ln[P_{\overline{R}/\overline{A}}(\overline{R}/\overline{A})]}{\partial A_j} + \frac{\partial \ln[P_{\overline{A}}(\overline{A})]}{\partial A_i} \cdot \frac{\partial \ln[P_{\overline{A}}(\overline{A})]}{\partial A_j} \right] \quad (10)$$

The corresponding likelihood function is $$L(\overline{R},\hat{\overline{A}}) = -\sum_{i=1}^{N} \frac{(R_i - K\epsilon_0 S_i)^2}{\sigma_i^2} + \ln[P_{\overline{A}}(\overline{A})] \quad (11)$$

BRIEF DESCRIPTION OF THE DRAWINGS

FIG. 3C shows a numerical technique for implementing the algorithm of FIG. 3B.

DESCRIPTION OF THE PREFERRED EMBODIMENT

Figure 3A:
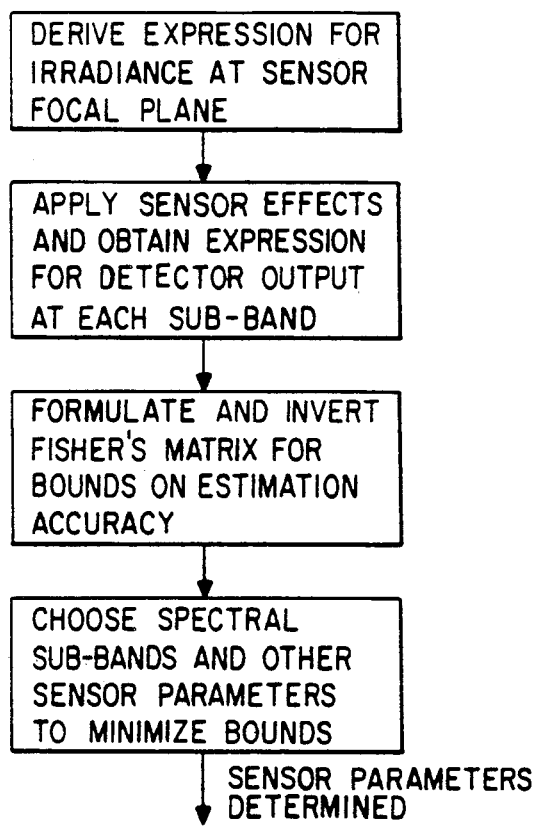
FIG. 3A is a flow diagram showing a method of choosing sensor parameters.
Figure 3B:
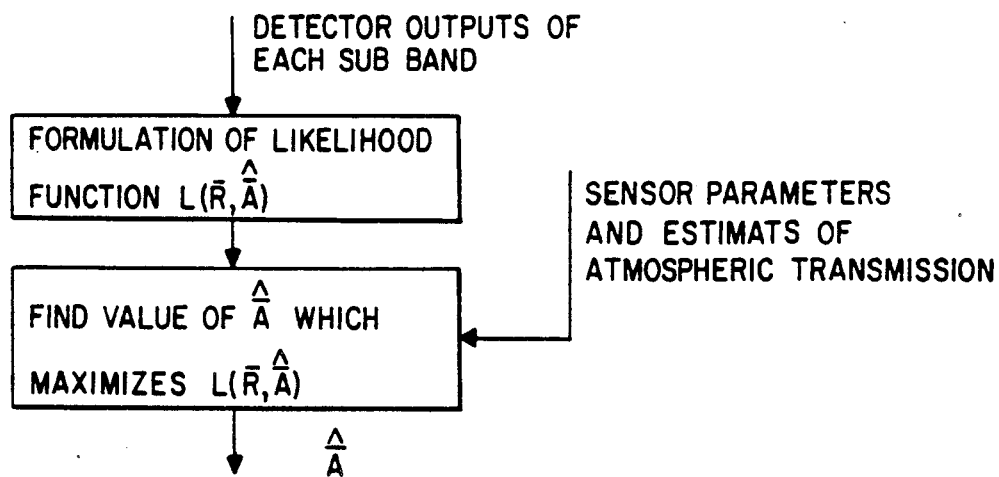
FIG. 3B is a flow diagram of an algorithm which takes data and estimates ($\epsilon$,T)

The preferred embodiment of the invention is described in FIGS. 3A, 3B and 3C. FIG. 3A depicts the method of choosing sensor or detector parameters. FIG. 3B is a flow diagram of the algorithm which takes sensor data and estimates ($\epsilon$,T). FIG. 3C illustrates the numerical technique to implement the algorithm of FIG. 3B.

The sensor or detector design parameters are selected as shown in FIG. 3A. An expression for the irradiance H ($\lambda$) in the focal plane of the sensor is $$H(\lambda) = \frac{\tau_A(\lambda)\epsilon\omega(\lambda)\tau_0(\lambda)}{4F_\#^2}$$

The irradiance is detected by the sensor and the output $R_i$ of the detector for the ith sub-band of the sensor is $$R_i = \frac{G}{4F_\#^2} \int_{\lambda_i}^{\lambda_{i+1}} \frac{A_D \tau_A(\lambda)\tau_0(\lambda)\eta(\lambda)\epsilon_0 C_1 d\lambda}{\lambda^5(e^{c_2/KT} - 1)hc} + n_i$$

$$= \epsilon_0 K S_i + n_i$$

A measurement vector $\overline{R}=(R_1, R_2, \ldots R_N)$ and an unknown vector $\overline{A}=(\epsilon, T)$ are formed. With knowledge of the statistics of $n_i$, the $P_{\overline{R}/\overline{A}}(\overline{R}/\overline{A})$ is formed Fisher's Matrix J with terms $J_{ij}$ is $$J_{ij} = E\left[ \frac{\partial \ln[P_{\overline{R}/\overline{A}}(\overline{R}/\overline{A})]}{\partial A_i} \cdot \frac{\partial \ln[P_{\overline{R}/\overline{A}}(\overline{R}/\overline{A})]}{\partial A_j} \right]$$

The inverse of J defined as $J^{-1}$ is taken. The diagonal terms of J', namely $J^{-1}_{ii}$ form the bounds upon the estimation accuracy of A, namely $$\sigma^2_{Ai} \geq J^{-1}_{ii}$$

The estimate of the ith component of $\overline{A}$ must have a mean squared error $\sigma^2_i$ which is no less than $J^{-1}_{ii}$. The bounds on emissivity and temperature are $J^{-1}_{11}$ and $J^{-1}_{22}$, respectively, and are $$J^{-1}_{11} = J^{-1}_{11}(G,\tau_A, \tau_0, \epsilon_0, T, F\#^2, N, \lambda_{L1}, \lambda_{U1}, \lambda_{L2}, \lambda_{U2}, \ldots \lambda_{LN}, \lambda_{UN})$$

and $$J^{-1}_{22} = J^{-1}_{22}(G,\tau_A, \tau_0, \epsilon_0, T, F\#^2, N, \lambda_{L1}, \lambda_{U1}, \lambda_{L2}, \lambda_{U2}, \ldots \lambda_{LN}, \lambda_{UN})$$

The bounds $J^{-1}_{11}$ and $J^{-1}_{22}$ are functions of the atmospheric transmission $\tau_A$, the object temperature and emissivity and the sensor parameters. The design parameters are chosen to minimize $J^{-1}_{11}$ and $J^{-1}_{22}$ for a given object temperature and emissivity and for a given atmospheric transmission. The mathematical procedures to find the sensor design parameters are referred to as optimization procedures. It should be noted that the sensor parameters which minimize $J^{-1}_{11}$ may not be the same set that minimized $J^{-1}_{22}$. In other words, the sensor which best estimates temperature may not be the best one to estimate emissivity. Also, the sensor which is optimum for one atmospheric transmission $\tau_A$ may not be optimum for another value of $\tau_A$.

The most straightforward way to minimize $J^{-1}_{11}$ and $J^{-1}_{22}$ is to exhaustively evaluate $J^{-1}_{11}$ and $J^{-1}_{22}$ at all values of the sensor parameters. This procedure is time consuming, but feasible with present day fast computers. Another approach is the steepest gradient method. In this method, the gradients of $J^{-1}_{11}$ and $J^{-1}_{22}$ are formed as $$\nabla J^{-1}_{11} = \frac{\partial J^{-1}_{11}}{\partial G} \overline{a}_G + \frac{\partial J^{-1}_{11}}{\partial \tau_0} \overline{a}_{\tau_0} + \ldots + \frac{\partial J^{-1}_{11}}{\partial F_\#} \overline{a}_{F_\#}$$

and $$\nabla J^{-1}_{22} = \frac{\partial J^{-1}_{22}}{\partial G} \overline{a}_G + \frac{\partial J^{-1}_{22}}{\partial \tau_0} \overline{a}_{\tau_0} + \ldots + \frac{\partial J^{-1}_{22}}{\partial F_\#} \overline{a}_{F_\#}$$

where $\overline{a}_G, \overline{a}_{\tau_0}, \ldots \overline{a}_{F_\#}$ are unit vectors. $J^{-1}_{11}$ is optimized by starting at one candidate design point $\overline{P}_o$ where $$\overline{P}_o = (G_o, \tau_A, \tau_{oo}, \eta_o, \ldots \epsilon_o, T, F^2_{\#o}).$$

The value of $J^{-1}_{11}$ at $\overline{P}_o$, namely $J^{-1}_{11}(\overline{P}_o)$, is formed. The next estimate of $\overline{P}$, namely $\overline{P}_1$ becomes $$\overline{P}_1 = \overline{P}_0 + \frac{\partial J^{-1}_{11}(\overline{P}_0)}{\partial G} \Delta\, G\overline{a}_G + \frac{\partial J^{-1}_{11}(\overline{P}_0)}{\partial \tau_0} \Delta\, J_0\overline{a}_{\tau_0} + \ldots + \frac{\partial J^{-1}_{11}}{\partial F_\#} \Delta\, F_\# \overline{a}_{F_\#}$$

where ($\Delta G, \Delta J_o, \ldots F_\#$) is a suitably small increment in $\overline{P}$. This procedure is repeated until the value which minimizes $J^{-1}_{11}$ is found. A similar procedure is used to minimize $J^{-1}_{22}$. The skilled mathematician will find many more ways to minimize $J^{-1}_{11}$ and $J^{-1}_{22}$.

Figure 1:
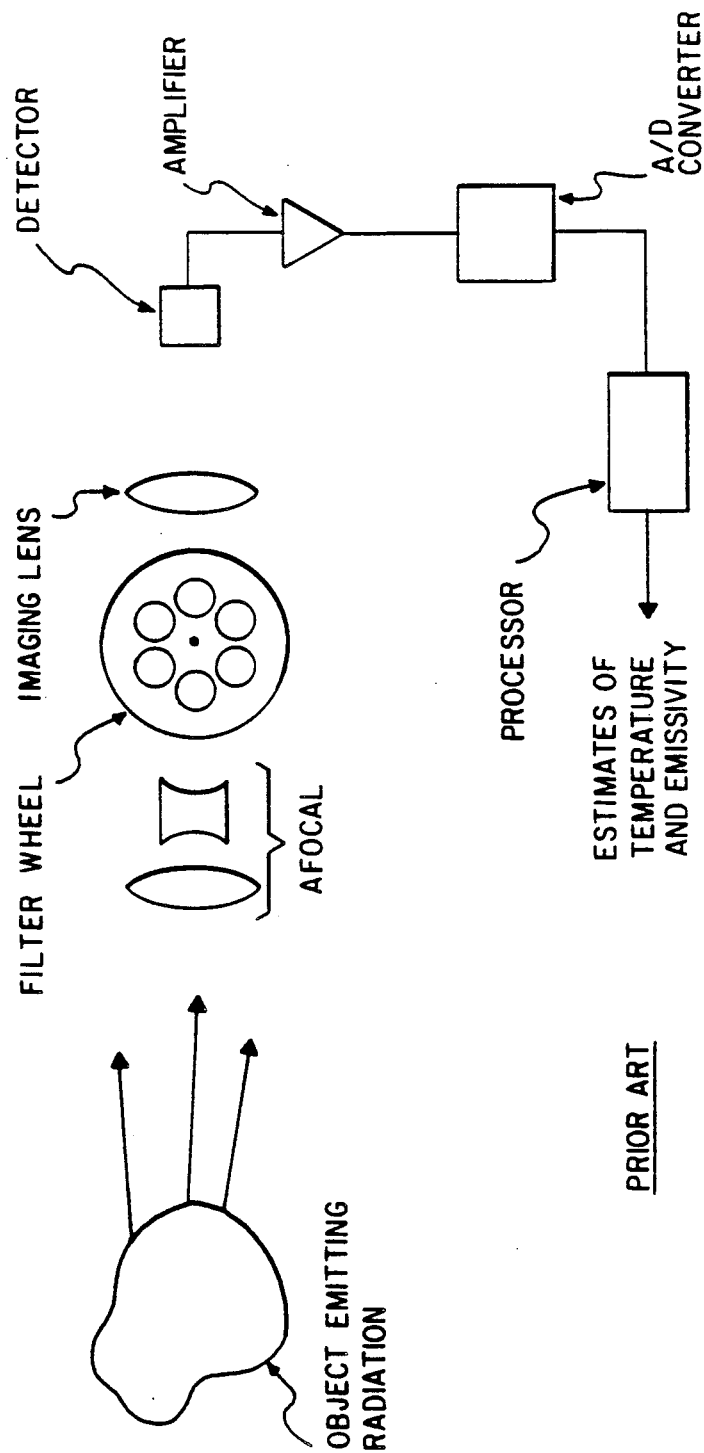
FIG. 1 is a schematic diagram of a multi-spectral sensor to measure temperature and emissivity using a filter wheel.
Figure 2:
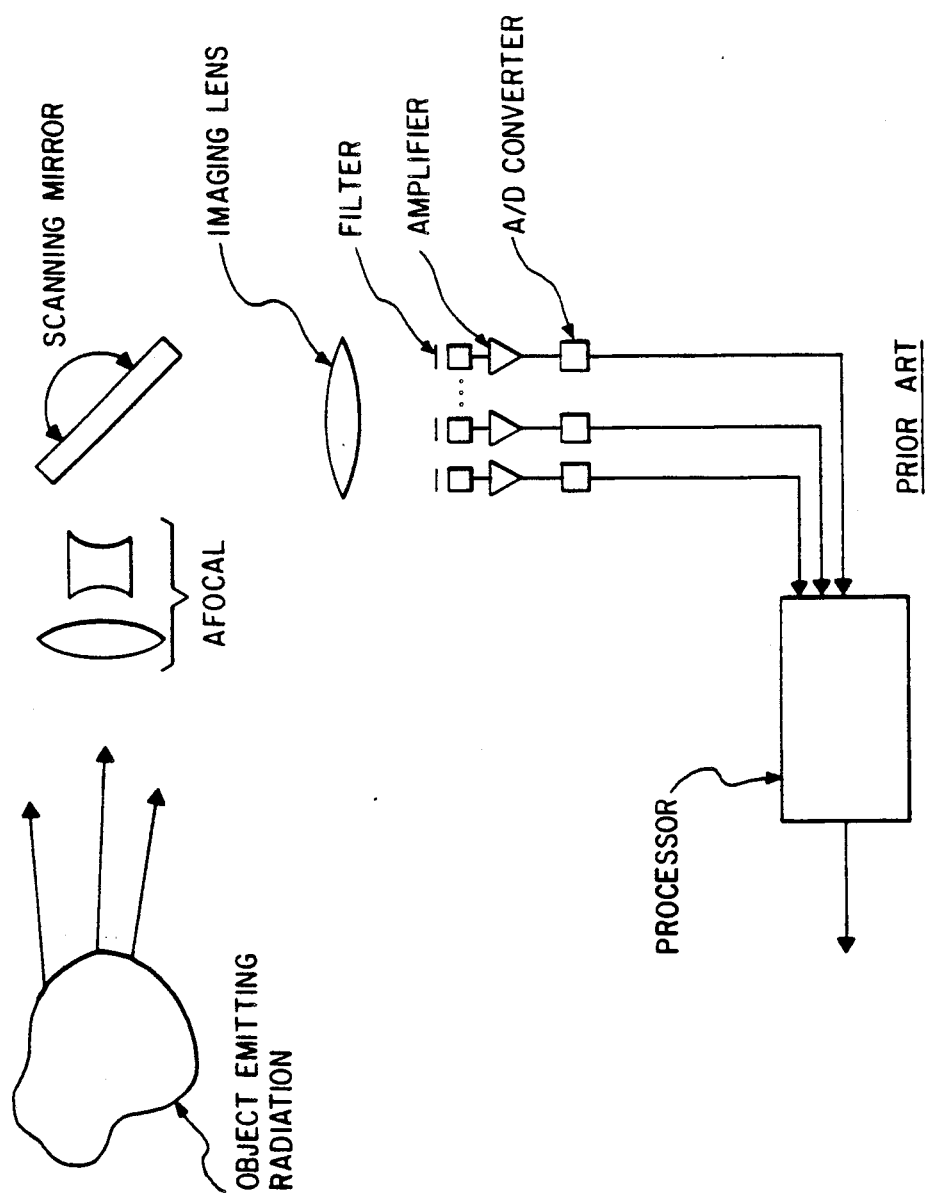
FIG. 2 is a schematic diagram of a multi-spectral sensor to measure temperature and emissivity using a scanner.

The processor illustrated in FIGS. 1 and 2 effectively finds the value of ($\epsilon_o$,T) which minimizes L ($\overline{R},\hat{\overline{A}}$). The outputs $\overline{R}$ from the detectors are substituted into L ($\overline{R},\overline{A}$) and $\hat{\overline{A}}$ is varied until L ($\overline{R},\overline{A}$) is maximized. The value of $\hat{\overline{A}}$ which maximizes $L(\overline{R},\hat{\overline{A}})$ is taken to be the estimate of $\overline{A}$. One means to find $\hat{\overline{A}}$ is to exhaustively evaluate $L(\overline{R},\hat{\overline{A}})$ over the entire range of values that $\overline{A}$ can have. For example, if it is known that $$T_L \leq T \leq T_M$$

and $$\epsilon_{oL} \leq \epsilon_o \leq \epsilon_{om}$$

values of $\hat{\overline{A}} = (T_L + i\Delta T_1, \epsilon_o + j\Delta\epsilon_o)$ can be used as candidates where $$\Delta T = \frac{T_m - T_L}{M}$$

$$\Delta\epsilon_0 = \frac{\epsilon_{0m} - \epsilon_{0L}}{N}$$

and i ranges from 0 to M and j ranges from 0 to N. This method works well if the possible values of $\epsilon_o$ and T lie in a small interval and $L(R,A)$ is a reasonably well behaved function. If not, exhaustive search can take a great deal of computer time. A more efficient search method, with respect to computer time is a variant of Newton's Method and is depicted in FIG. 3. An initial estimate $\hat{\epsilon}_{o1}, \hat{T}_1$) is made. This estimate may result from an exhaustive search with a large step size. Next, the two sets of equations depicted in FIG. 3C are solved for $(A_2,B_2)$ and $(D_2,E_2)$. These values are then substituted into the set of two linear equations as shown resulting in $\epsilon_{o3}$ and $T_3$. The procedure is repeated until a sufficiently accurate estimate of $(\epsilon_o, T)$ is obtained.

Although the discussion presented hereinabove is in terms of black or gray body radiators whose properties are specified by the temperature and emissivity, other radiators do exist. For example, the exhaust plume of a gas turbine engine is an emitter which has its unique characteristics. Such emitters are also included as a part of this invention. If a mathematical expression can be written for the spectral radiance of the radiator, methods and instruments completely analagous to those described above can be used to measure and estimate the parameters of that expression.

Though the invention has been described with respect to specific preferred embodiments thereof, many variations and modifications will become apparent to those skilled in the art. It is therefore the intention that the appended claims be interpreted as broadly as possible in view of the prior art to include all such variations and modifications.

I claim:

1. A method of measuring the temperature and emissivity of a remote body, comprising the steps of:
    (a) determining the frequency range of radiation emitted by the body whose temperature and emissivity is to be measured;
    (b) providing a sensor for detecting radiation in predetermined different frequency bands within said frequency range;
    (c) determining the different frequency bands to be covered by said sensor and other sensor parameters by deriving an expression for irradiance at the focal plane of said sensor, applying the outputs of said sensor in said expression for irradiance to obtain an expression for sensor output at each said frequency band formulating and inverting Fisher's Matrix for bounds on estimation accuracy and choosing spectral frequency bands and other sensor parameters to minimize the bounds on the estimation accuracy to provide the sensor parameters;
    (d) sensing the energy radiated by the remote body whose temperature is to be measured by said sensor;
    (e) providing an output from said sensor of the amount of energy measured in each frequency band;
    (f) providing a processor;
    (g) sending the outputs from said sensor to said processor;
    (h) determining the temperatures and emissivity of said body in said processor from the outputs of said sensor; and
    (i) providing an output from said process indicative of the measured temperature and emissivity.

2. A method of measuring the temperature and emissivity of a remote body, comprising the steps of:
    (a) determining the frequency range of radiation emitted by the body whose temperature and emissivity is to be measured;
    (b) providing a sensor for detecting radiation in predetermined different frequency bands within said frequency range;
    (c) determining the different frequency bands to be covered by said sensor;
    (d) sensing the energy radiated by the remote body whose temperature is to be measured by said sensor;
    (e) providing an output from said sensor of the amount of energy measured in each frequency band;
    (f) providing a processor;
    (g) sending the outputs from said sensor to said processor;
    (h) determining the temperatures and emissivity of said body in said processor from the outputs of said sensor; and
    (i) providing an output from said process indicative of the measured temperature and emissivity;
    (j) wherein step (h) is determined by formulation of a likelihood function $L(R,A)$ in response to said outputs from said sensor and finding the values of A which maximizes $L(R,A)$ in response to said likelihood function, the parameters of said sensor and an estimate of atmospheric transmission.

3. A method of measuring the temperature and emissivity of a remote body, comprising the steps of:
    (a) determining the frequency range of radiations emitted by the body whose temperature is to be measured;
    (b) providing a sensor for detecting radiations in predetermined different frequency bands within said frequency range;
    (c) determining the different frequency bands to be covered by said sensor and other sensor parameters by deriving an expression for irradiance at the focal plane of said sensor, applying the outputs of said sensor in said expression for irradiance to obtain an expression for sensor output at each said frequency band formulating and inverting Fisher's Matrix for bounds on estimation accuracy and choosing spectral frequency bands and other sensor parameters to minimize the bounds on the estimation accuracy to provide the sensor parameters;

(d) sensing the energy radiated by the remote body whose temperature is to be measured by said sensor;

(e) providing an output from said sensor of the amount of energy measured in each frequency band;

(f) providing a processor;

(g) determining the temperature and emissivity of said body in said processor from the outputs of said sensor; and (i) providing an output from said process indicative of the measured temperature and emissivity.

4. The method of claim 3 wherein step (g) is determined by formulation of a likelihood function $L(R,\overline{A})$ in response to said outputs from said sensor and finding the values of $\overline{A}$ which maximizes $L(R,\overline{A})$ in response to said likelihood function, the parameters of said sensor and an estimate of atmospheric transmission.

5. A method of measuring a parameter of a remote body, comprising the steps of:

(a) determining the frequency range of radiations emitted by the body whose temperature is to be measured;

(b) providing a sensor for detecting radiations in predetermined different frequency bands within said frequency range;

(c) determining the different frequency bands to be covered by said sensor and other sensor parameters by deriving an expression for irradiance at the focal plane of said sensor, applying the outputs of said sensor in said expression for irradiance to obtain an expression for sensor output at each said frequency band formulating and inverting Fisher's Matrix for bounds on estimation accuracy and choosing spectral frequency bands and other sensor parameters to minimize the bounds on the estimation accuracy to provide the sensor parameters;

(d) sensing the energy radiated by the remote body whose parameter is to be measured by said sensor;

(e) providing an output from said sensor of the amount of energy measured in each frequency band;

(f) providing a processor;

(g) determining the parameter of said body in said processor from the outputs of said sensor; and (h) providing an output from said process indicative of the measured parameter.

6. The method of claim 5 wherein step (g) is determined by formulation of a likelihood function $L(R,\overline{A})$ in response to said outputs from said sensor and finding the values of $\overline{A}$ which maximizes $L(R,\overline{A})$ in response to said likelihood function, the parameters of said sensor and an estimate of atmospheric transmission.

7. A method of measuring a parameter of a remote body, comprising the steps of:

(a) determining the frequency range of radiations emitted by the body whose temperature is to be measured;

(b) providing a sensor for detecting radiations in predetermined different frequency bands within said frequency range;

(c) determining the different frequency bands to be covered by said sensor and other sensor parameters by deriving an expression for irradiance at the focal plane of said sensor, applying the outputs of said sensor in said expression for irradiance to obtain an expression for sensor output at each said frequency band formulating and inverting Fisher's Matrix for bounds on estimation accuracy and choosing spectral frequency bands and other sensor parameters to minimize the bounds on the estimation accuracy to provide the sensor parameters;

(d) sensing the energy radiated by the remote body whose parameter is to be measured by said sensor;

(e) providing an output from said sensor of the amount of energy measured in each frequency band;

(f) providing a processor;

(g) determining the parameter of said body in said processor from the outputs of said sensor; and (h) providing an output from said process indicative of the measured parameter.

8. The method of claim 7 wherein step (g) is determined by formulation of a likelihood function $L(R,\overline{A})$ in response to said outputs from said sensor and finding the values of $\overline{A}$ which maximizes $L(R,\overline{A})$ in response to said likelihood function, the parameters of said sensor and an estimate of atmospheric transmission.

* * * * *